(12) United States Patent
Quirk et al.

(10) Patent No.: US 8,325,135 B2
(45) Date of Patent: Dec. 4, 2012

(54) SYSTEMS AND METHODS FOR DETECTING CURSOR INTERFERENCE IN VISUAL DISPLAYS

(75) Inventors: Robert J. Quirk, Peoria, AZ (US); Paul Fisher, Sun City West, AZ (US); Larry James Miller, Black Canyon City, AZ (US)

(73) Assignee: Honeywell International Inc., Morristown, NJ (US)

( * ) Notice: Subject to any disclaimer, the term of this patent is extended or adjusted under 35 U.S.C. 154(b) by 991 days.

(21) Appl. No.: 12/355,957

(22) Filed: Jan. 19, 2009

(65) Prior Publication Data

US 2010/0182233 A1     Jul. 22, 2010

(51) Int. Cl.
*G01C 23/00*     (2006.01)
(52) U.S. Cl. ........................................ 345/157; 340/973
(58) Field of Classification Search .................. None
See application file for complete search history.

(56) References Cited

U.S. PATENT DOCUMENTS

| | | | |
|---|---|---|---|
| 5,689,666 A | 11/1997 | Berquist et al. | |
| 6,112,141 A * | 8/2000 | Briffe et al. | 701/14 |
| 6,219,028 B1 | 4/2001 | Simonson | |
| 6,381,519 B1 | 4/2002 | Snyder | |
| 6,418,223 B1 | 7/2002 | Wootton et al. | |
| 6,753,891 B1 * | 6/2004 | Chohan et al. | 715/790 |
| 7,283,064 B2 | 10/2007 | He | |
| 7,565,380 B1 * | 7/2009 | Venkatachary | 1/1 |
| 2002/0063740 A1 * | 5/2002 | Forlenza et al. | 345/856 |
| 2006/0159347 A1 | 7/2006 | Derks et al. | |
| 2008/0002894 A1 | 1/2008 | Hayon et al. | |
| 2008/0252489 A1 | 10/2008 | Naimer et al. | |

\* cited by examiner

*Primary Examiner* — Van Chow
(74) *Attorney, Agent, or Firm* — Ingrassia Fisher & Lorenz, P.C.

(57) ABSTRACT

A system for detecting cursor interference includes a graphics engine configured to generate graphics information; a first evaluation unit coupled to the graphics engine and configured to evaluate the graphics information; a cursor generation unit coupled to the graphics engine and configured to generate cursor information, the cursor generator further configured to merge the cursor information and the graphics information into merged information; a second evaluation unit coupled to the cursor generation unit and configured to evaluate the merged information; and a display device coupled to the cursor generation unit and configured to display the merged information based on the evaluations of the graphics information and the merged information.

20 Claims, 3 Drawing Sheets

SYSTEMS AND METHODS FOR DETECTING CURSOR INTERFERENCE IN VISUAL DISPLAYS

TECHNICAL FIELD

The present invention generally relates to aircraft visual display systems and methods, and more particularly relates to systems and methods for detecting cursor interference in visual displays.

BACKGROUND

Aircraft flight displays continue to advance in sophistication, achieving increasingly higher levels of information density, and consequently, presenting a greater amount of visual information to be perceived and understood by the operator on a visual display. In many applications, it is important that visual displays provide a proper cognitive mapping between what the operator is trying to achieve and the information available to accomplish the task.

In addition to the large amount of information provided on the visual display, it also includes menu items that may be selected and/or modified by the user with an input device, typically by selecting an item with a cursor. However, some conventional visual displays may have cursors that may obscure other, more important graphical information. To prevent this issue, some conventional visual display may attempt to limit the cursor to a particular area of the visual display. However, unwanted software or hardware issues may theoretically result in the cursor being rendered outside of this cursor area, thus resulting in the possibility that the cursor obscures important information or to prevent misinterpretation.

Accordingly, it is desirable to provide a visual display in which the cursor information does not obscure graphical information. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with one exemplary embodiment, a system for detecting cursor interference includes a graphics engine configured to generate graphics information; a first evaluation unit coupled to the graphics engine and configured to evaluate the graphics information; a cursor generation unit coupled to the graphics engine and configured to generate cursor information, the cursor generator further configured to merge the cursor information and the graphics information into merged information; a second evaluation unit coupled to the cursor generation unit and configured to evaluate the merged information; and a display device coupled to the cursor generation unit and configured to display the merged information based on the evaluations of the graphics information and the merged information.

In accordance with another exemplary embodiment, a method of detecting cursor interference on a visual display includes generating graphics information for display on the visual display; evaluating the graphics information to generate a first evaluation value; generating cursor information for display on the visual display; merging the cursor information and the graphics information to generate merged information; evaluating the merged information to generate a second evaluation value; comparing the first and second evaluation values; and displaying the merged information on the visual display if the first and second evaluation values match.

In accordance with yet another exemplary embodiment, a system for detecting cursor interference includes a graphics engine configured to generate graphics information; a first cyclic redundancy check unit coupled to the graphics engine and configured to evaluate the graphics information and to generate a first check value; a cursor generation unit coupled to the graphics engine and configured to generate cursor information, the cursor generator further configured to merge the cursor information and the graphics information into merged information; a second cyclic redundancy check unit coupled to the cursor generation unit and configured to evaluate the merged information and to generate a second check value; a processor coupled to the first and second evaluation units and configured to compare the first and second check values, the processor configured to generate a warning if the first check value differs from the second check value; and a display device coupled to the cursor generation unit and configured to display the merged information.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments disclosed herein include systems and methods for detecting cursor interference on visual displays. In general, the visual display may include graphics information with important flight information that should not be obscured by a cursor. The exemplary systems and methods include a first cyclic redundancy check unit that evaluates graphics information and a second cyclic redundancy check unit that evaluates the graphics information after it has been merged with cursor information. The results from the cyclic redundancy check units are then compared to determine if the cursor information is interfering with the graphics information. If the cyclic redundancy check values change, an issue can be identified, as appropriate.

Figure 1:
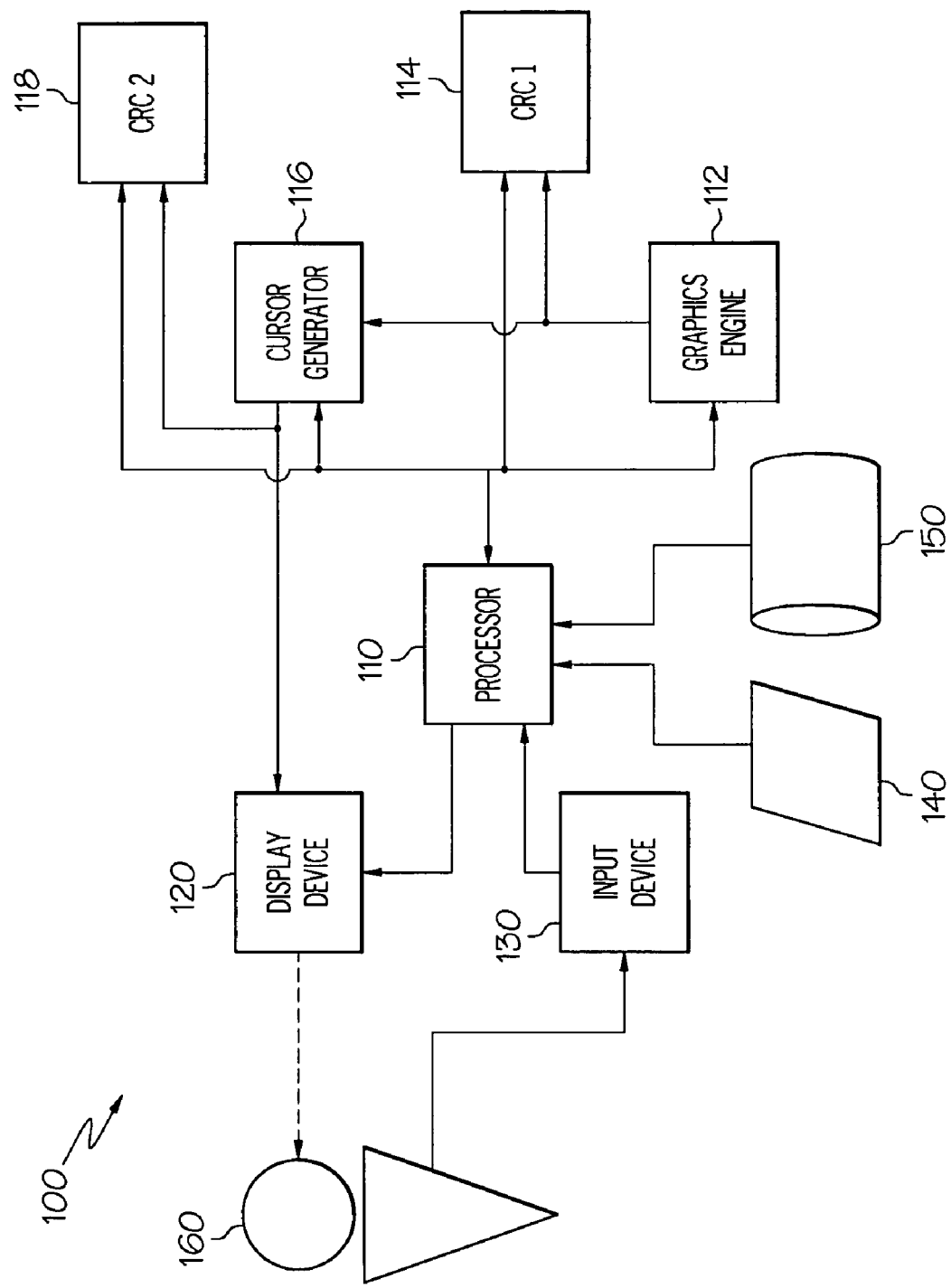
FIG. 1 is a block diagram of a system for detecting cursor interference in accordance with an exemplary embodiment.

FIG. 1 is a block diagram of a display system 100 that includes the ability to detect cursor interference in accordance with an exemplary embodiment. In general, the system 100 includes a processor 110 configured to communicate with a display device 120, one or more input devices 130, avionics data 140, and one or more data sources 150. In general, one or more users 160, such as, for example, a pilot and/or a co-pilot, located within an aircraft, provide input to processor 110 through input device 130, and receive visual feedback via a display produced by display device 120. As discussed in further detail below, the visual display on the display device 120 includes various data elements associated with the lateral position, vertical position, flight plan and/or other indications of the aircraft's operational state as determined from avionics data 140 and/or data sources 150. Through use of input device 130, the user 160 may interact with the data elements graphically in accordance with feedback provided by display device 120.

The input device 130 may include any device suitable to accept input from the user 160 and to convert that input to a graphical position on the display device 120. Particularly, the input device 130 includes cursor control, such as various types of joysticks, mice, trackballs, and the like that are suitable for this purpose. In one embodiment, the input device 130 includes a touch-pad interface device with a thumb actuation switch on the side. In an alternate embodiment, the input device 130 is a trackball device coupled with one or more keys or push-buttons used to select data captured by the cursor.

The display device 120 may include any display monitor suitable for displaying the various symbols and information detailed herein. Examples include cathode ray tube (CRT), liquid crystal display (LCD), Heads Up Displays (HUDs), Helmet Mounted Displays (HMDs) and other electronic display systems. In one exemplary embodiment, the display device 120 is an LCD flat panel display (FPD) associated with a primary flight display (PFD) of an aircraft. One example of an exemplary display rendered by the display device 120 will now be described.

Figure 2:
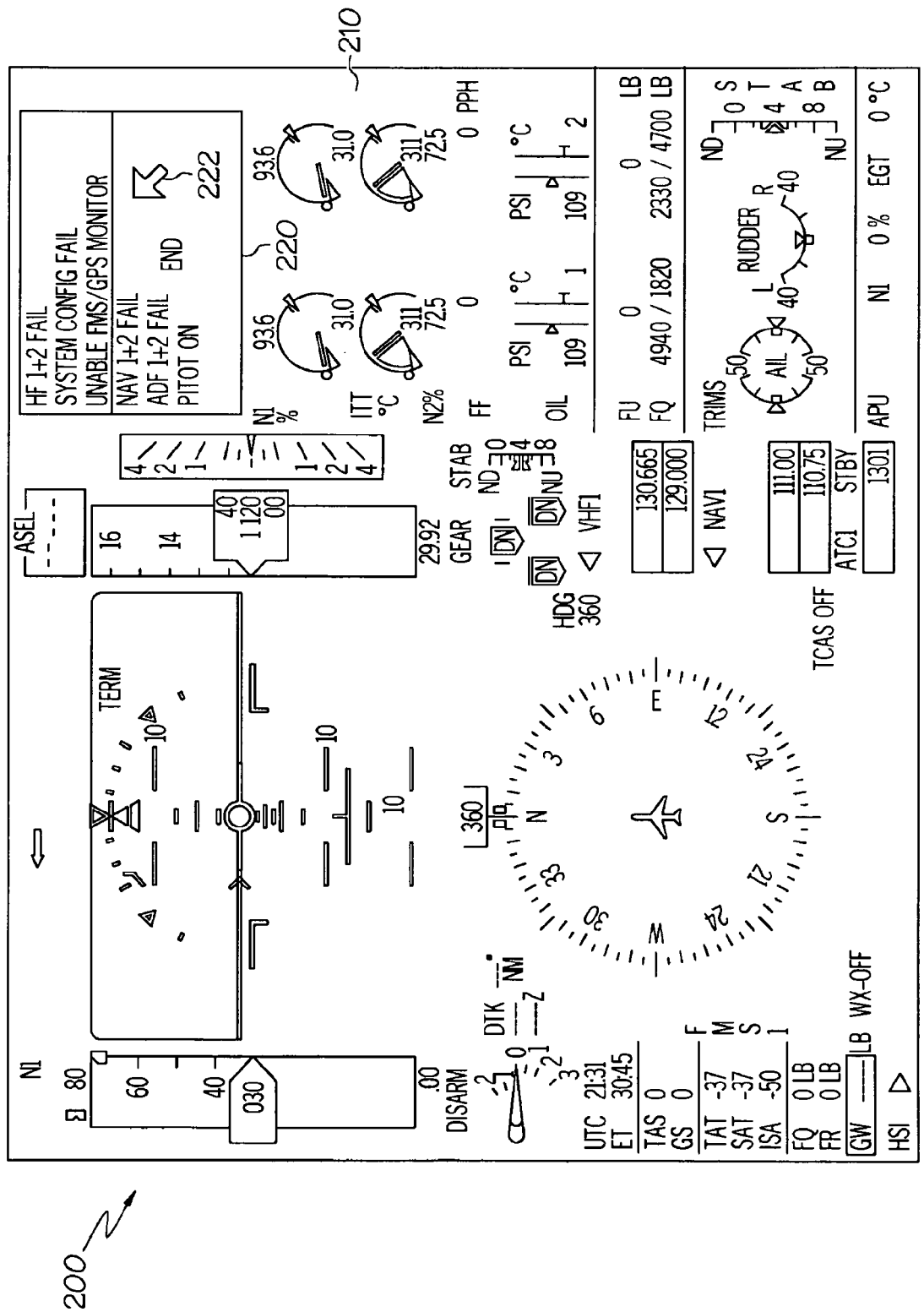
FIG. 2 is a visual display rendered by the system of FIG. 1 in accordance with an exemplary embodiment.

FIG. 2 is a visual display 200 that may be rendered on the display device 120 by the system 100 of FIG. 1 in accordance with an exemplary embodiment. The visual display 200 of FIG. 2 generally includes a first area 210 with first symbology representing graphics information and a second area 220 with second symbology such as a cursor 222. In general, a cursor 222 should be confined to the second area 220 to prevent interference with the graphical information in the first area 210. In various embodiments, the second area 220 can be larger or smaller, and include certain types of graphical information, although the second area 220 with the cursor 222 should not overlap important graphical information. As one example, the important graphical information can include, for example, airspeed, a horizon line and altitude. Other graphics information can include, for example, a perspective, synthetic view, a horizontal situation indicator (HSI), instrument information, and flight plan information. In the depicted exemplary embodiment, the second area 220 includes a menu of items to be selected and/or modified with the cursor 222 based on input from an input device, such as input device 130 of FIG. 1. The first and second areas 210, 220 may be defined by X-Y coordinates. In various embodiments, the first and second areas 210, 220 of the visual display 200 need not be identically or substantially identically sized and are not shown to scale, as each area 210, 220 may have a different aspect ratio than that shown.

Returning again to FIG. 1, the processor 110 encompasses one or more functional devices used to provide flight management and control, to interface with the input device 130, and to drive display device 120. In this regard, processor 110 may include any number of individual microprocessors, memories, storage devices, interface cards, and other components. The processor 110 may include components such as a Central Processing Unit (CPU), a Memory Control Hub (MCH), an I/O Controller Hub (ICH), and memory. In general, the processor 110 executes software and interfaces with the other components of the system 100. The processor 110 may additionally or alternatively include Northbridge and/or Southbridge logic.

Avionics data 140 includes aeronautical information related to the state of the aircraft derived from an aeronautical information database. Data sources 150 include various types of data required by the system 100 and/or desired by the user 160, such as, for example, flight plan data, data related to airways, navigational aids (Navaids), symbol textures, navigational data, obstructions, font textures, taxi registration, Special Use Airspace, political boundaries, COM frequencies (en route and airports), approach information, and the like. Typically, for example, a geographical information database is included within data sources 150.

As will now be described in further detail, the system 100 further includes a graphics engine 112, a first cyclic redundancy check (CRC) generator 114, a cursor generator 116, and a second cyclic redundancy check (CRC) generator 118 that interact with the processor 110 to detect cursor interference on the display device 120. In one exemplary embodiment, the first and second CRC generators 114, 118 are hardware logic functions, for example, residing inside the same hardware component, such as a programmable logic device (PLD). In other embodiments, the first and second CRC generators 114, 118 can be separate hardware components and/or software residing in memory and executable by the processor 110.

The graphics engine 112 receives data associated with the information to be displayed on the display device 120. As noted above, the information may include various data elements associated with the lateral position, vertical position, flight plan and/or other indicia of the aircraft's operational state as determined from avionics data 140 and/or data sources 150. The graphics engine 112 may interface with the processor 110 via, for example, an Accelerated Graphics Port (AGP) bus or a Peripheral Component Interconnect Extended bus (PCI-X) or a Peripheral Component Interconnect Express bus (PCI-E). The graphics engine generates graphics information for display on the display device 120. In one embodiment, the graphics information includes red, green and blue pixel information for display on the display device 120, along with vertical and horizontal synchronization signals based on the data from the processor 110.

An evaluation unit, such as the first CRC generator 114, receives and evaluates the graphics information for each display frame. The first CRC generator 114 can include, for example, a Peripheral Component Interconnect (PCI) bus to interface with the processor 110 and other components of the system 100.

In one exemplary embodiment, the first CRC generator 114 generates a check value based on a cyclic redundancy check performed on the graphics information associated with the first area 210 (FIG. 2). As noted above, the first area 210 should not include a cursor (e.g., cursor 222 of FIG. 2). In general, the first area 210 may include any area in which a cursor should not interfere with graphical information, and in some instances, may include portions of area 220. In general, the first CRC generator 114 can detect any single error from one bit in length up to the CRC bit length (typically 32 bits), and has a high probability of detecting multiple distributed errors. The first CRC generator 114 may include three separate generators, one each for the red, green and blue pixel color information. Alternatively, a single CRC generator can process all three colors together. The first CRC generator 114 uses the graphics synchronization signals to keep track of the absolute location of each serial pixel of the graphics information. After evaluation, the check values are transferred to the results registers, prior to the start of the next image frame.

The cursor generator 116 then generates cursor information for display on the display device 120. The cursor generator 116 can include, for example, a Peripheral Component Interconnect (PCI) interface to a bus that connects with the processor 110 and other components of the system 100. In general, the cursor generator 116 generates a cursor, such as cursor 222 of FIG. 2, which can be any symbol drawn to indicate the position of a user-controlled input device 130. The cursor generator 116 defines the shape, color, size and position of the cursor. The cursor generator 116 additionally receives the graphics information from the graphics engine, and merges the cursor information with the graphics information to result in merged display information.

The second CRC generator 118 receives the merged cursor and graphics information, as well as synchronization signals, from the cursor generator 116. The second CRC generator 118 generates a second check value by performing a cyclic redundancy check performed on the merged information associated with the first area 210 (FIG. 2) should not include a cursor, and stores the results in registers. Like the first CRC generator 114, the second CRC generator 118 may include three separate generators, one each for the red, green and blue pixel color information. Alternatively, a single CRC generator can process all three colors together. The second CRC generator 118 can include, for example, a Peripheral Component Interconnect (PCI) bus to interface with the processor 110 and other components of the system 100. In one exemplary embodiment, the first and second CRC generators 114, 118 are separate.

In one exemplary embodiment, the registers of the first and second CRC generators 114, 118 are locked at each frame, and the processor 110 compares the results. The comparison may be done with hardware or software, although in one embodiment, software executing in the processor 110 performs the comparison to reduce any effects of possibly of faulty hardware. If the check value from the first CRC generator 114 matches the check value from the second CRC generator 118, the system 100 can confirm that the cursor information from the cursor generator 116 is not interfering with the graphics information from the graphics engine 112. In other words, the system 100 assures that the cursor 222 is not displayed in the first area 210 (FIG. 2) by assuring that graphics in the first area 210 have not changed since the cursor was drawn. This assures that if a cursor generated by the cursor generator 116 obscures important graphics information from the graphics engine 112, the fault will be detected.

If the check value from the first CRC generator 114 does not match the check value from the second CRC generator 118, the processor 110 may issue a warning that the cursor information from the cursor generator 116 may be interfering with the graphics information from the graphics engine 112. In other words, the warning may indicate that a cursor or other image is being displayed in an unintended area, such as the first area 210 (FIG. 2). The warning may include, for example, a warning light and/or a message to the user 160. Other actions may also be taken, including resetting the hardware or blanking all or portions of the display and/or blanking the cursor.

In general, prior to comparing the CRC results, the processor 110 will lock the first and second CRC generators 114, 118 results registers. This ensures that results are compared for the same frame, even though other frames of data associated with the frames may be asynchronous. After reading the results, the registers are unlocked so they can be updated for the next frame. Although one exemplary embodiment is described with CRC generators 114, 118, other evaluation units may be utilized, including checksum and/or parity-type generators. In one exemplary embodiment, the CRC generators 114, 118 use the CRC-32-IEEE-802.3 algorithm, although other algorithms may also be used.

Figure 3:
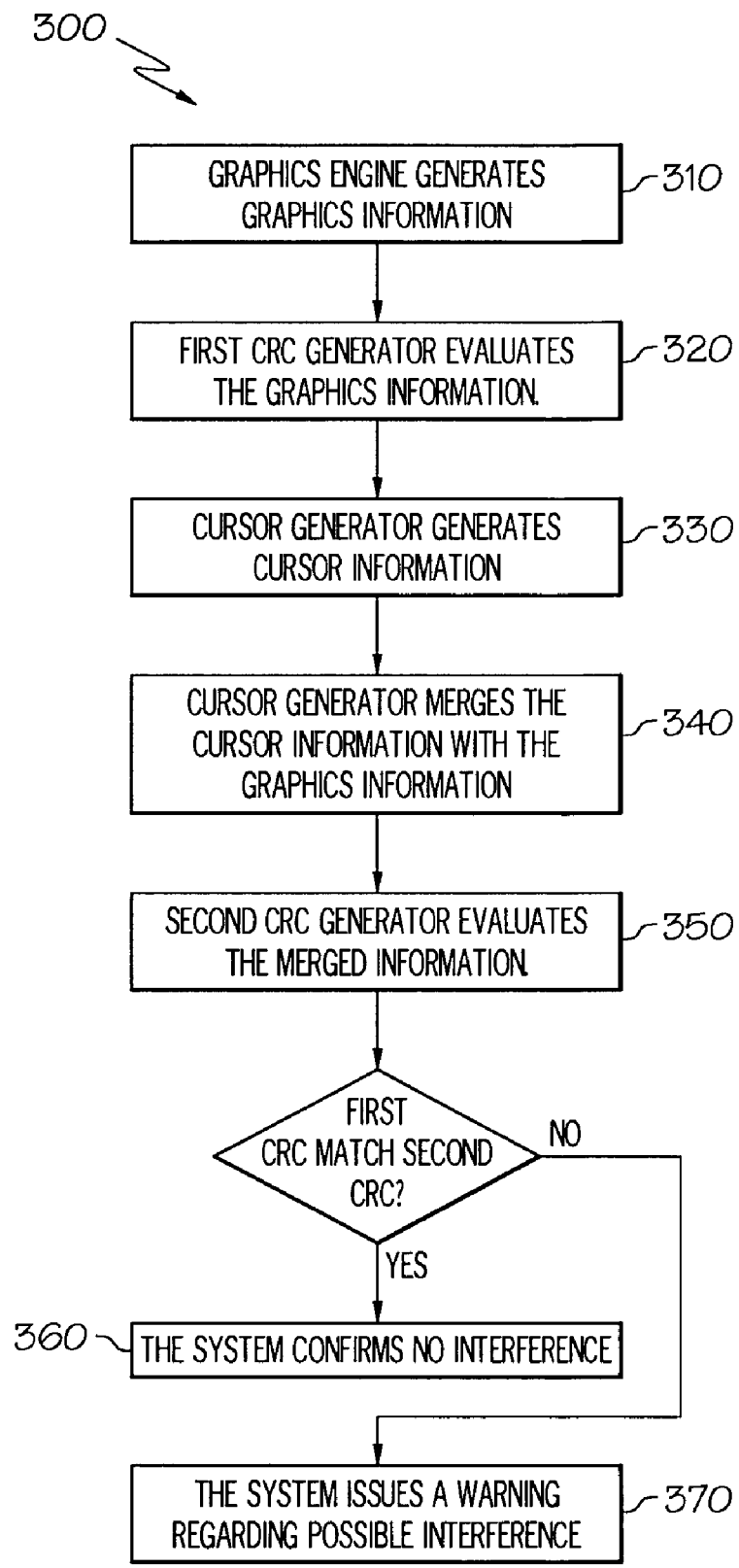
FIG. 3 is a method for detecting cursor interference in accordance with an exemplary embodiment.

FIG. 3 is a method 300 for detecting cursor interference in accordance with an exemplary embodiment. The method 300 may be performed, for example, with the system 100 discussed above and will be described with reference to FIG. 1.

In a first step 310, the graphics engine 112 receives data associated with the information to be displayed on the display device 120 and generates graphics information. In a second step 320, the first CRC generator 114 receives and evaluates the graphics information for each display frame. The first CRC generator 114 may evaluate the graphics information by generating a check value based on a cyclic redundancy check. The expected cursor area may be excluded from the evaluated graphics information.

In a third step 330, the cursor generator 116 generates cursor information for display on the display device 120. In a fourth step 340, the cursor generator 116 additionally receives the graphics information from the graphics engine, and merges the cursor information with the graphics information to result in merged display information.

In a fifth step 350, the second CRC generator 118 receives the merged cursor and graphics information, as well as synchronization signals, from the cursor generator 116, and generates a second check value by performing a cyclic redundancy check on the merged information associated with the first area 210 (FIG. 2). The expected cursor area is excluded from the evaluated merged information. In a sixth step 360, the processor 110 compares the results from the first and second CRC generators 114, 118.

If the check value from the first CRC generator 114 matches the check value from the second CRC generator 118, in a sixth step 360, the system 100 confirms that the cursor information from the cursor generator 116 is not interfering with the graphics information from the graphics engine 112. In this condition, generally no indication will be provided to the user 160. If the check value from the first CRC generator 114 does not match the check value from the second CRC generator 118, in a seventh step 370, the processor 110 may issue a warning that the cursor information from the cursor generator 116 may be interfering with the graphics information from the graphics engine 112. This method 300 can be repeated for each display frame. As such, this method 300, as well as system 100, indicates to a user that the cursor may be obscuring the graphics information, for example, if software and/or hardware failures place the cursor in an unintended area.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for detecting cursor interference, comprising:
a graphics engine configured to generate graphics information;
a first evaluation unit coupled to the graphics engine and configured to evaluate the graphics information;
a cursor generation unit coupled to the graphics engine and configured to generate cursor information, the cursor generator further configured to merge the cursor information and the graphics information into merged information;

a second evaluation unit coupled to the cursor generation unit and configured to evaluate the merged information; and a display device coupled to the cursor generation unit and configured to display the merged information based on the evaluations of the graphics information and the merged information.

2. The system of claim 1, wherein the first evaluation unit is a first cyclic redundancy check unit configured to perform a cyclic redundancy check on the graphics information and to generate a first check value.

3. The system of claim 2, wherein the second evaluation unit is a second cyclic redundancy check unit configured to perform a cyclic redundancy check on the merged information and to generate a second check value.

4. The system of claim 3, further comprising a processor coupled to the first and second evaluation units and configured to compare the first and second check values.

5. The system of claim 4, wherein the processor is configured to generate a warning if the first check value differs from the second check value.

6. The system of claim 1, wherein the display device is configured to display a visual display with a first area and a second area, the first area including first symbology based on the graphics information and the second area including cursor symbology based on the cursor information.

7. The system of claim 6, wherein the first evaluation unit is configured to evaluate graphics information associated with the first area, and the second evaluation unit is configured to evaluate merged information associated with the first area.

8. The system of claim 7, wherein the first symbology includes important flight information.

9. The system of claim 1, wherein the first and second evaluation units include registers configured to store evaluation results.

10. The system of claim 1, wherein the first evaluation unit and second evaluation units each includes individual evaluation generators for red, green, and blue pixels.

11. A method of detecting cursor interference on a visual display, comprising the steps of:

generating graphics information for display on the visual display;

evaluating the graphics information to generate a first evaluation value;

generating cursor information for display on the visual display;

merging the cursor information and the graphics information to generate merged information;

evaluating the merged information to generate a second evaluation value;

comparing the first and second evaluation values; and displaying the merged information on the visual display if the first and second evaluation values match.

12. The method of claim 11, further comprising generating a warning if the first evaluation value does not match the second evaluation value.

13. The method of claim 11, wherein the evaluating the graphical information step includes performing a first cyclic redundancy check to produce a first check value as the first evaluation value.

14. The method of claim 13, wherein the evaluating the merged information step includes performing a second cyclic redundancy check to produce a second check value as the second evaluation value.

15. The method of claim 14, wherein the visual display has a first area associated with the graphical information and a second area associated with the cursor information, and wherein the evaluating the merged information step includes evaluating the merged information associated with the first area.

16. The method of claim 15, wherein the merged information associated with the first area includes important flight information.

17. The method of claim 14, further comprising respectively storing the first and second check values in first and second registers.

18. The method of claim 14, wherein the performing the first cyclic redundancy check step includes performing a first cyclic redundancy check for each of the red, green, and blue pixels of the graphics information, and wherein the performing the second cyclic redundancy check step includes performing a second cyclic redundancy check for each of the red, green, and blue pixels of the merged information.

19. The method of claim 11, wherein evaluating the merged information step is repeated for each display frame.

20. A system for detecting cursor interference, comprising:

a graphics engine configured to generate graphics information;

a first cyclic redundancy check unit coupled to the graphics engine and configured to evaluate the graphics information and to generate a first check value;

a cursor generation unit coupled to the graphics engine and configured to generate cursor information, the cursor generator further configured to merge the cursor information and the graphics information into merged information;

a second cyclic redundancy check unit coupled to the cursor generation unit and configured to evaluate the merged information and to generate a second check value;

a processor coupled to the first and second evaluation units and configured to compare the first and second check values, the processor configured to generate a warning if the first check value differs from the second check value; and a display device coupled to the cursor generation unit and configured to display the merged information.

* * * * *